(12) United States Patent
Maehara

(10) Patent No.: US 6,777,905 B2
(45) Date of Patent: Aug. 17, 2004

(54) VOLTAGE REGULATOR FOR CONTROLLING OUTPUT OF AUTOMOTIVE ALTERNATOR

(75) Inventor: Fuyuki Maehara, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/263,744

(22) Filed: Oct. 4, 2002

(65) Prior Publication Data

US 2003/0095025 A1 May 22, 2003

(30) Foreign Application Priority Data

Nov. 8, 2001 (JP) ........................................ 2001-343138

(51) Int. Cl.⁷ ................................................ G05F 1/10
(52) U.S. Cl. ...................... 318/650; 318/254; 318/138; 318/437
(58) Field of Search ................................ 318/650, 254, 318/138, 437, 466, 560, 652, 653, 684, 689, 671, 504; 322/28

(56) References Cited

U.S. PATENT DOCUMENTS 5,173,654 A    12/1992  Boella et al.
5,923,151 A  *  7/1999  Satoh ........................... 322/28
6,034,499 A  *  3/2000  Tranovich .................... 318/650
6,426,607 B1 *  7/2002  Merlo et al. ................. 320/150

FOREIGN PATENT DOCUMENTS

| DE | 43 31 640 C1 | 3/1995 |
| DE | 198 01 361 A1 | 2/1999 |
| EP | 0 813 067 A2 | 12/1997 |
| EP | 1 130 766 A1 | 9/2001 |
| JP | A 5-316667 | 11/1993 |

* cited by examiner

Primary Examiner—Karen Masih
(74) Attorney, Agent, or Firm—Oliff & Berridge, PLC

(57) ABSTRACT

A voltage regulator controls an output of an automotive alternator by controlling an amount of excitation current supplied to a field winding of the alternator. The amount of the excitation current is sensed by a sensing resistor as a sensed voltage appearing across the sensing resistor. The sensed voltage is amplified by an amplifier to obtain a detected voltage, an amplifying factor of which is adjusted based on an reference voltage precisely corresponding to the amount of the excitation current, and thereby the detected voltage is equalized to the reference voltage. In this manner, the excitation current is precisely detected without mechanically adjusting a resistance of the sensing resistor by function-trimming or the like.

20 Claims, 2 Drawing Sheets

VOLTAGE REGULATOR FOR CONTROLLING OUTPUT OF AUTOMOTIVE ALTERNATOR

CROSS-REFERENCE TO RELATED APPLICATION

This application is based upon and claims benefit of priority of Japanese Patent Application No. 2001-343138 filed on Nov. 8, 2001, the content of which is incorporated herein by reference.

BACKGROUND OF THE INVENTION

1. Field of the Invention

The present invention relates to a voltage regulator for controlling an output of an alternator for use in an automotive vehicle, and more particularly to a voltage regulator that controls an output of an alternator a driving torque of which is controlled.

2. Description of Related Art

An example of a voltage regulator that controls an output of an alternator to various levels without changing the alternator itself is disclosed in JP-A-5-316667. In this voltage regulator, a circuit for restricting excitation current of the alternator is included, and the output of the alternator is changed by function-trimming of divider resistors in the restricting circuit.

In a recent automotive vehicle, a higher alternator output is required to supply electrical power to various electrical and electronic components. On the other hand, it is required to stabilize rotational speed of an engine, especially in its idling state. The rotational speed of the engine is considerably influenced by a driving torque of the alternator when an alternator generating a high power is used. Therefore, the engine has to be controlled taking the driving torque of the alternator into consideration. The driving torque may be calculated based on an amount of excitation current supplied to a field winding of the alternator.

A voltage regulator constituted by a monolithic IC (integrated circuit) is becoming widely used in order to make the voltage regulator compact. To calculate the rotational torque of an alternator based on the excitation current, it is necessary to precisely detect the amount of the excitation current. Because the excitation current is detected by a sensing resistor in the voltage regulator, a resistance of the sensing resistor has to be precisely set. The resistance of the sensing resistor is set to a desired level by function-trimming the resistor. However, it is difficult to precisely set the resistance because an amount of current for setting the resistance is restricted by a size of a probing needle to a much lower level than an amount of current in an actual use. In addition, it is also difficult to precisely set an amplification factor of an amplifier for amplifying a voltage sensed by the sensing resistor.

SUMMARY OF THE INVENTION

The present invention has been made in view of the above-mentioned problem, and an object of the present invention is to provide a voltage regulator in which an amount of excitation current of an alternator is correctly detected without precisely setting the resistance of a sensing resistor by function-trimming or the like.

The alternator is composed of a stator having an armature winding, a rotor having a field winding and a rectifier for rectifying an alternating current generated in the armature winding to an direct current. A voltage regulator for controlling an output of the alternator is connected to the alternator. The alternator output is controlled by controlling an amount of an excitation current supplied to the field winding.

The voltage regulator includes a sensing resistor through which a current proportional to an amount of the excitation current flows. A voltage sensed by the sensing resistor is amplified by an amplifier outputting a detected voltage. The detected voltage is compared with a reference voltage that correctly corresponds to the amount of the excitation current. An amplification factor of the amplifier is adjusted based on a difference between the detected voltage and the reference voltage thereby to equalize the detected voltage to the reference voltage. In this manner, the amount of the excitation current is precisely detected without adjusting a resistance of the sensing resistor by function-trimming or the like.

Data indicating the difference between the detected voltage and the reference voltage are stored in a non-volatile memory, and the amplification factor of the amplifier is adjusted based on the data stored in the non-volatile memory. That is, the amount of the excitation current is precisely detected by electronically adjusting the detected voltage without mechanically trimming the sensing resistor. In addition, a desired amount of the excitation current is set by an electronic control unit that determines the amount of the excitation current, taking a rotational torque required for driving the alternator into consideration to stabilize an idling speed of the engine.

Other objects and features of the present invention will become more readily apparent from a better understanding of the preferred embodiment described below with reference to the following drawings.

DETAILED DESCRIPTION OF THE PREFERRED EMBODIMENT

Figure 1:
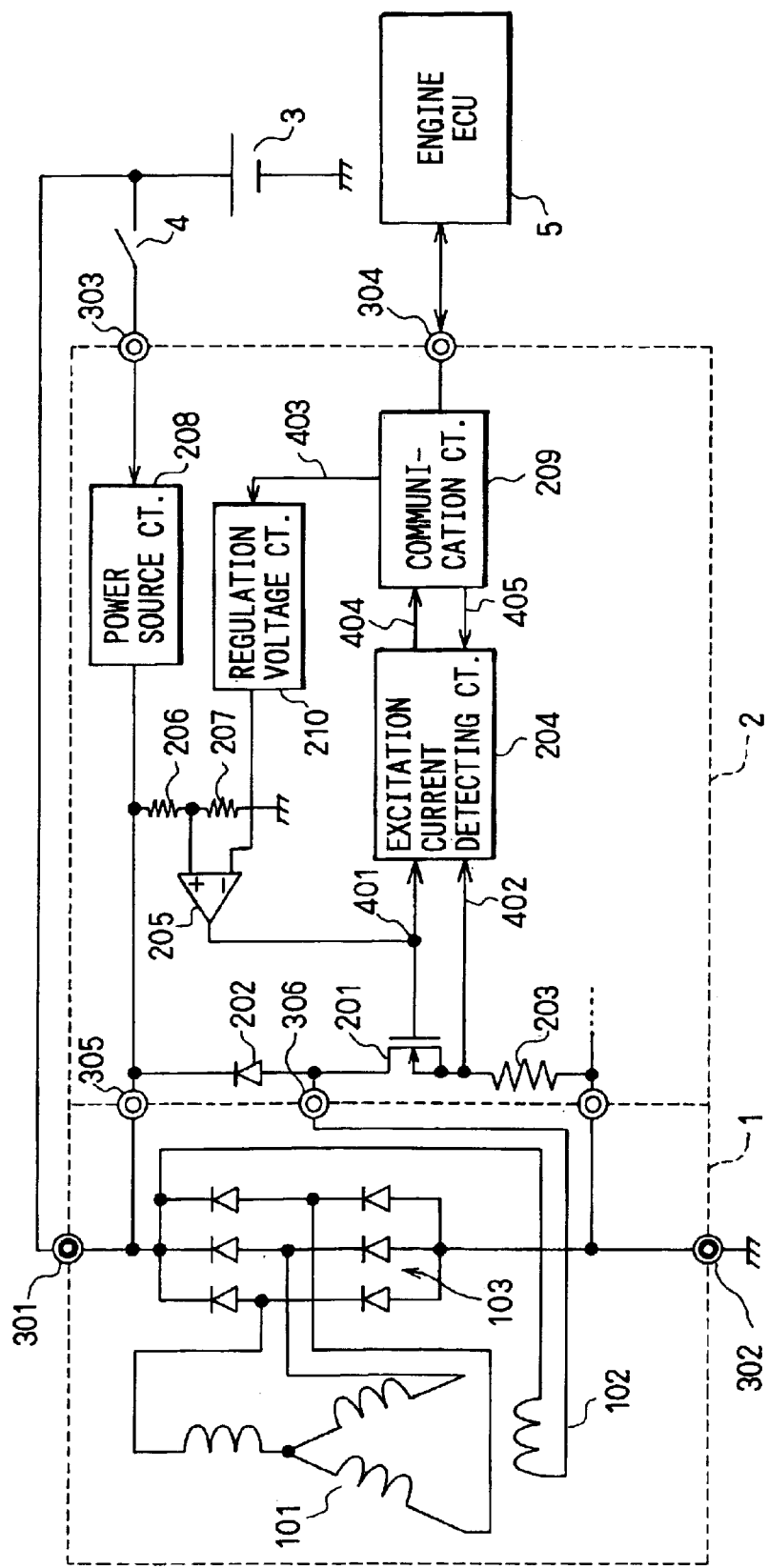
FIG. 1 is a block diagram showing an entire system including an alternator and a voltage regulator.

A preferred embodiment of the present invention will be described with reference to accompanying drawings. First, referring to FIG. 1, an entire electrical wiring structure of an alternator and a voltage regulator will be described. The alternator 1 is composed of a stationary armature having a three-phase armature winding 101, a rotor having a field winding 102, and a three-phase full-wave rectifier 103. A plus terminal of the rectifier 103 is connected to an output terminal 301 and a power source terminal 305, and a minus terminal of the rectifier 103 is connected to a ground terminal 302. One end of the field winding 102 is connected to the power source terminal 305 and the other end is connected to a field terminal 306.

The voltage regulator 2 for controlling the output of the alternator 1 includes an N-channel MOS-FET (field effect transistor) 201, an excitation current detecting circuit 204, a communication circuit 209, a regulation voltage circuit 210, a comparator 205, a power source circuit 208 and other associated components. The voltage regulator 2 also includes an ignition key terminal 303 which is connected to an on-board battery 3 through an ignition key switch 4 and a communication terminal 304 connected to an engine ECU (electronic control unit) 5.

The excitation current flows through a series circuit composed of the power source terminal 305, the field winding 102, the field terminal 306, the MOS-FET 201, a sensing resistor 203 and the ground terminal 302. An amount of excitation current supplied to the field winding 102 is controlled by the MOS-FET 201. A circulating diode 202 is connected between the power source terminal 305 and the field terminal 306. A gate terminal of the MOS-FET 201 is connected to an excitation current detecting circuit 204 through a wire 401, and a positive end of the sensing resistor 203 is connected to the excitation current detecting circuit 204 through a wire 402. The communication circuit 209 is connected to the excitation current detecting circuit 204 through wires 404 and 405. The communication circuit 209 communicates with the engine ECU 5 via the communication terminal 304.

A series circuit composed of divider resistors 206 and 207 is connected between the power source terminal 305 and the ground. An output voltage of the alternator 1 is divided by the resistors 206 and 207. The divided voltage and a regulation voltage fed from the regulation voltage circuit 210 are supplied to the comparator 205, and both voltages are compared in the comparator 205. An output of the comparator 205 is fed to the gate terminal of the MOS-FET 201. The regulation voltage circuit 210 communicates with the communication circuit 209 through, a wire 403 thereby to set the regulation voltage therein.

Figure 2:
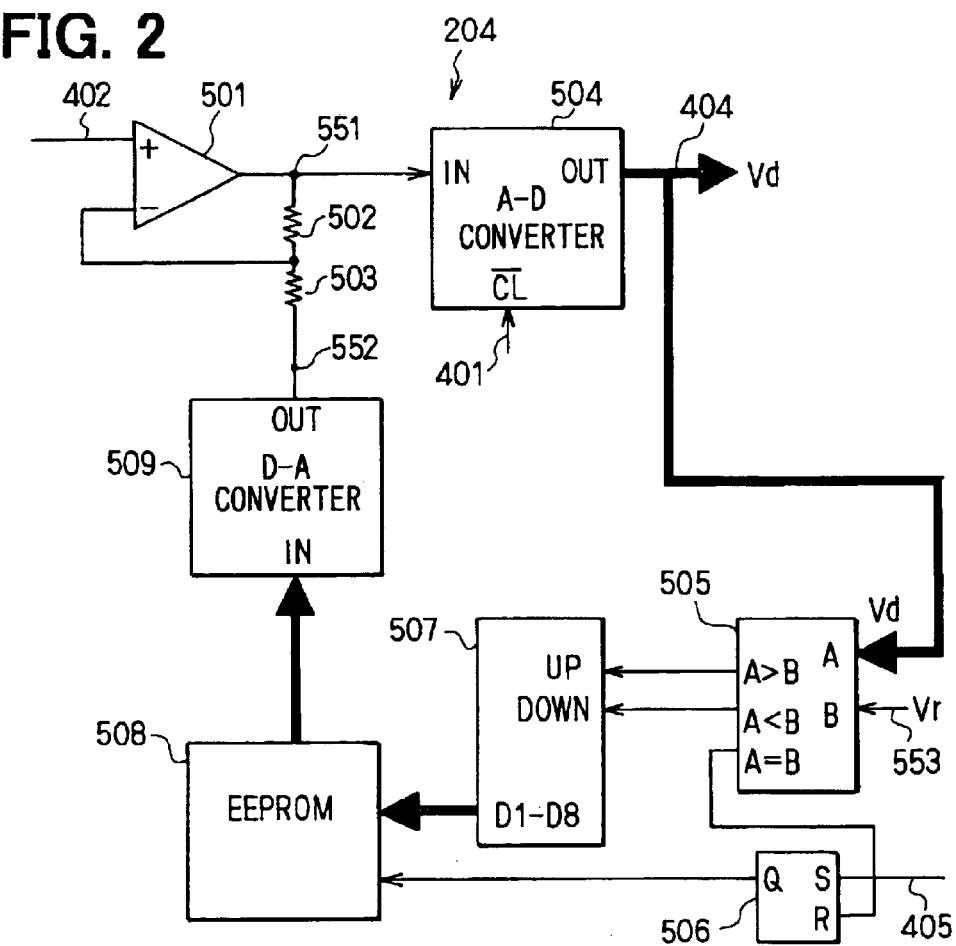
FIG. 2 is a block diagram showing an excitation current detecting circuit used in the system shown in FIG. 1.

Now, referring to FIG. 2, the excitation current detecting circuit 204 will be described in detail. A sensed voltage detected by the sensing resistor 203, which represents an amount of the excitation current supplied to the field winding 102, is fed to an operational amplifier 501 through the wire 402. The operational amplifier 501 constitutes an amplifier for amplifying the sensed voltage together with divider resistors 502 and 503. The amplified voltage $V_{551}$ appearing at a point 551 is fed to an A-D (analog to digital) converter 504 and converted into an 8-bit digital voltage (referred to as a detected voltage Vd). The gate terminal of the MOS-FET 201 is connected to a CL-bar terminal of the A-D converter 504 through the wire 401, so that a driving signal of the MOS-FET 201 is detected by the A-D converter 504. The detected voltage Vd converted from the analog voltage $V_{551}$ is latched at a timing when the driving signal is switched from ON to OFF and is outputted to the wire 404.

When the excitation current detecting circuit 204 receives a command signal to adjust the excitation current from the communication circuit 209 through the wire 405, the detected voltage Vd representing the present amount of excitation current is fed to an A-terminal of a digital comparator 505 through the wire 404. At the same time, a reference voltage Vr (having a level to which the level of the detected voltage Vd is to be adjusted) is fed to a B-terminal of the digital comparator 505 through a wire 553. The detected voltage Vd is compared with the reference voltage Vr. If the Vd is larger than Vr (A>B), an UP-signal is fed to an up-down counter 507, and if the Vd is smaller than Vr (A<B), a DOWN-signal is fed to the up-down counter 507. According to the UP-signal or the DOWN-signal, outputs of the up-down counter 507 are set to a level between D1 to D8 and fed to a non-volatile memory (EEPROM) 508.

On the other hand, the excitation current adjusting command is supplied to an S-terminal of a flip-flop circuit (F/F) 506 from the communication circuit 209 through the wire 405. When the detected voltage Vd is not equal to the reference voltage Vr, a signal for permitting renewal of the non-volatile momory 508 is sent from a Q-terminal of the flip-flop circuit 506. The non-volatile memory 508 is renewed according to the outputs D1–D8 fed from the up-down counter 507, and the renewed value is memorized in the non-volatile memory 508. At the same time, the renewed value is fed to a D-A (digital to analog) converter 509 and converted into an analog value. The analog value is fed to the divider resistor 503 of the amplifier through a wire 552. When the detected voltage Vd is equal to the reference voltage Vr (A=B), the signal is fed to R-terminal of the flip-flop circuit 506 thereby to bring an output level of a Q-terminal to a low level. When the output level of the Q-terminal is turned to a low level, the renewal of the non-volatile memory 508 is terminated.

Figure 3:
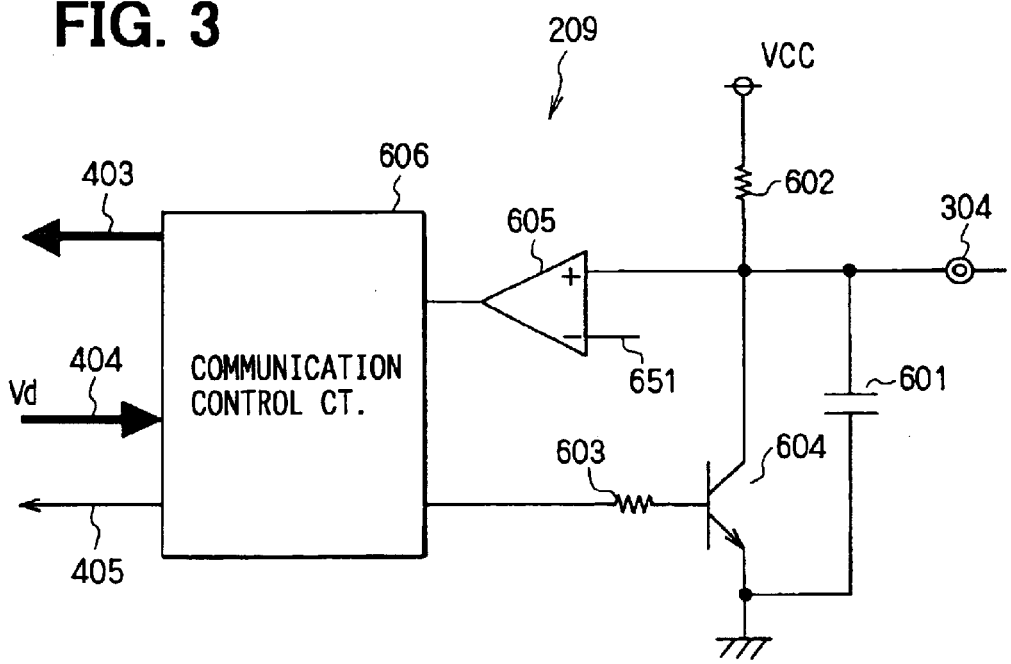
FIG. 3 is a block diagram showing a communication circuit used in the system shown in FIG. 1.

Referring to FIG. 3, the communication circuit 209 communicating with the engine ECU 5 through the communication terminal 304 will be described in detail. The communication circuit 209 is composed of a communication control circuit 606, a comparator 605, a transistor 604 and other associated components connected as shown in FIG. 3. A collector of the transistor 604 is connected to a source voltage Vcc via a bias resistor 602, and its emitter is grounded. A noise-removing capacitor 601 is connected between the collector and the emitter of the transistor 604. A base of the transistor 604 is connected to the communication control circuit 606 via a resistor 603.

A communication signal from the engine ECU 5 is fed to a plus terminal of the comparator 605 and is compared with a standard voltage fed to its minus terminal. An output of the comparator is supplied to the communication control circuit 606. The detected value Vd is supplied to the communication control circuit 606 from the A-D converter 504 through the wire 404. A signal indicating the detected value Vd is sent from the communication control circuit 606 to the engine ECU 5 through the resistor 603 and the transistor 604. The communication control circuit 606 supplies the regulation voltage to the regulation voltage circuit 210 through the wire 403 and the command to adjust the excitation current to the excitation current detecting circuit 204 through the wire 405.

Now, the control of the alternator outputs will be described with reference to FIG. 1. Upon turning on the ignition key switch 4, a power source voltage is supplied to the power source circuit 208 and operation of the voltage regulator 2 is initiated. During a period in which the engine is being cranked up, the output voltage of the alternator 1 is lower than the regulation voltage supplied to the comparator 205. Therefore, the comparator 205 outputs a high level signal H which is supplied to the base of the MOS-FET 201. The MOS-FET 201 is turned on by the high level signal thereby to supply the excitation current to the field winding 102.

When a rotational speed of the engine reaches an idling speed, the output of the alternator 1 is established and supplied to the battery 3. When the output voltage exceeds the regulation voltage, the output of the comparator 205 is turned from the high level H to a low level L, and the MOS-FET 201 is turned off to stop supply of the excitation current. Thus, the output voltage of the alternator 1 decreases again. The output voltage of the alternator 1 is controlled to the level of the regulation voltage by repeating the above-described on-off control of the MOS-FET 201.

The regulation voltage itself is adjusted according to communication with the engine ECU 5. The communication signal is continuously supplied from the engine ECU 5 to the voltage regulator 2 via the communication terminal 304. The level of the digital communication signal is compared with the standard voltage in the comparator 605. The output of the comparator 605 is fed to the communication control circuit 606, in which what kinds of the communication signal are fed is identified. When the data signal for setting the regulation voltage, to which the output voltage of the alternator 1 is to be controlled, is fed to the communication control circuit 606, the data signal is sent to the regulation voltage circuit 210 in a form of 8-bit data. The regulation voltage circuit 210 converts the 8-bit data signal into an analog regulation voltage. Thus, the level of the regulation voltage to be fed to the comparator 205 is changed by communication with the engine ECU 5.

Operation of the excitation current detecting circuit 204 will be explained with reference to FIG. 2. The sensed voltage, representing an amount of the excitation current supplied to the field winding 102, detected by the sensing resistor 203 (shown in FIG. 1) is fed to the amplifier constituted by the operational amplifier 501 and the divider resistors 502, 503. The sensed voltage is amplified to the amplified voltage $V_{551}$ which is fed to the A-D converter 504. The A-D converter 504 detects a timing at which the MOS-FET 201 is turned from an ON-state to an OFF state based on the signal fed from the gate of the MOS-FET 201 to the CL-bar terminal of the A-D converter 504. At that timing, the amplified voltage $V_{551}$ is taken into the A-D converter 504 and converted into an 8-bit digital signal that is defined as the detected signal Vd.

The detected voltage Vd is sent to the communication control circuit 606 (shown in FIG. 3) through the wire 404. The communication control circuit 606 sends a signal indicating the detected voltage Vd to the engine ECU 5 when such is requested from the engine ECU 5. The engine ECU 5 calculates a rotational torque of the alternator 1 based on the amount of excitation current represented by the detected voltage Vd, a rotational speed of the engine, and other factors. The engine ECU 5 controls operation of the engine, using the calculated rotational torque of the alternator 1, to stabilize the idling speed of the engine.

Now, how the detected voltage Vd is adjusted to precisely represent the amount of the excitation current without performing function-trimming of the sensing resistor 203 will be explained. After the voltage regulator 2 is molded in a single unit, the detected voltage Vd is adjusted in the following manner. A load through which a setting current (e.g., in an amount of 2 amperes) flows is connected between the power source terminal 305 and the field terminal 306, so that the setting current flows through the sensing resistor 203 when a standard regulation voltage is supplied between the power source terminal 305 and the ground.

While supplying the standard regulation voltage to the voltage regulator 2, the command signal for adjusting the excitation current is fed to the communication terminal 304. The communication control circuit 606 in the communication circuit 209 (shown in FIG. 3) recognizes the signal fed from the communication terminal 304 as the command signal and sends the command signal to the flip-flop circuit 506 shown in FIG. 2. The flip-flop circuit 506 sends a high level signal to the non-volatile memory 508 thereby to permit a memory renewal therein. At this moment, the sensed voltage corresponding to the excitation current of 2 amperes (the setting current is presumed to be 2 amperes for explanation purpose) is supplied to the operational amplifier 501 through the wire 402.

This sensed voltage is amplified to the voltage $V_{551}$ (the voltage at the point 551) by the amplifier consisting of the operational amplifier 501 and the divider resistors 502, 503. The voltage $V_{551}$ is expressed by the following formula: $V_{551}=[(R_{502}+R_{503})/R_{503}]\times(V_{402}-V_{552})$, where $R_{502}$ and $R_{503}$ are resistance values of the divider resistors 502 and 503, respectively, $V_{402}$ is the sensed voltage fed from the wire 402, and $V_{552}$ is a voltage at the point 552. The amplified voltage $V_{551}$ in an analog value is fed to the A-D converter 504 and converted into an 8-bit digital value (which is defined as the detected voltage Vd in the foregoing description).

The detected voltage Vd is compared with a reference voltage Vr in the digital comparator 505. The reference voltage Vr is pre-set as a voltage corresponding to the excitation current of 2 amperes. The detected voltage Vd is not always equal to the pre-set reference voltage Vr, because the resistance value of the sensing resistor 203 deviates from a target value due to various factors in a manufacturing process.

If it is determined that the detected voltage Vd is larger than the reference voltage Vr, the up-down counter 507 is counted up, and the output (between D1 and D8) of the up-down counter 507 is supplied to the non-volatile memory 508. The non-volatile memory 508 is renewed according to the output fed from the up-down counter 507, and this renewal is memorized in the non-volatile memory 508. The renewed memory value is sent to the D-A converter 509 and converted into an analog value thereby to increase the voltage $V_{552}$. As clear from the foregoing formula, the voltage $V_{551}$ decreases according to increase of the voltage $V_{552}$. The level of the voltage $V_{551}$ is adjusted in this manner until the detected voltage Vd becomes equal to the reference voltage Vr. When the detected voltage becomes equal to the reference voltage Vr, the output of the flip-flop circuit 506 becomes to a low level thereby to terminate the renewal of the non-volatile memory 508. Thus, the non-volatile memory 508 is fixed to a correct level.

On the other hand, if the detected voltage Vd is lower than the reference voltage Vr, the up-down counter 507 is counted down thereby to decrease the voltage $V_{552}$. The voltage $V_{551}$ increases according to decrease of the voltage $V_{552}$ until the detected voltage Vd is equalized to the reference voltage Vr. Thus, the detected voltage Vd is easily adjusted to precisely represent an amount of the excitation current supplied to the field winding 102 without performing difficult function-trimming on the sensing resistor 203.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A voltage regulator for controlling an output voltage of an automotive alternator by controlling an amount of excitation current supplied to a field winding of the alternator, the voltage regulator comprising:

means for detecting an amount of excitation current supplied to the field winding as a detected voltage;

means for communicating with an outside electronic device, the communicating means receiving a signal for adjusting the detected voltage; and means for adjusting the detected voltage to a level correctly representing the amount of excitation current supplied to the field winding upon receipt of the adjusting signal from the communicating means.

2. The voltage regulator as in claim 1, wherein:
the detecting means includes a sensing resistor, through which current proportional to the excitation current flows, for generating a sensed voltage across the sensing resistor, and an amplifier for amplifying the sensed voltage; and
an amplification factor of the amplifier is adjusted so that the output level of the amplifier is brought to a predetermined level when the adjusting signal is received from the communicating means.

3. The voltage regulator as in claim 1, wherein:
an amount of the detected voltage to be adjusted is stored in a non-volatile memory.

4. The voltage regulator as in claim, wherein:
the communicating means includes a communication terminal through which communication with the outside electronic device in both directions is performed; and
the communicating means, in addition to receiving the signal for adjusting the detected voltage, transmits data representing the detected voltage to the outside electronic device and receives a regulation voltage to which the output voltage of the alternator is to be regulated.

5. The voltage regulator as in claim 4, wherein:
the communicating means transmits the data representing the detected voltage to the outside electronic device when such is requested.

6. The voltage regulator as in claim 5, further comprising:
a switching element for controlling the excitation current supplied to the field winding;
a regulation voltage circuit for generating a regulation voltage based on data sent through the communicating means; and
a comparator for comparing the output voltage of the alternator with the regulation voltage and for controlling the switching element in an ON-OFF fashion.

7. The voltage regulator as in claim 2, wherein:
the predetermined level is a voltage level that correctly represents an amount of the excitation current.

8. The voltage regulator as in claim 3, wherein:
the non-volatile memory is brought to a condition, under which the amount of the detected voltage to be adjusted can be stored in the non-volatile memory, when the signal for adjusting the detected voltage is received.

9. A voltage regulator for controlling an output voltage of an automotive alternator to a regulation voltage by controlling excitation current supplied to a field winding in an ON-OFF fashion, the voltage regulator comprising:
means for detecting the excitation current, the detecting means including a sensing resistor across which a sensed voltage proportional to the excitation current appears and an amplifier for amplifying the sensed voltage;
means for communicating with an outside electronic device in both directions, the communicating means receiving from the outside electronic device a signal for adjusting a sensing level of the detecting means and a regulation voltage to which the output voltage is to be regulated, the communicating means transmitting to the outside electronic device data representing the excitation current detected by the detecting means when such transmission is requested;
means for regulating the output voltage of the alternator to the level of the regulation voltage received through the communicating means; and
means for adjusting the sensed voltage to a voltage level that correctly represents the excitation current actually flowing through the field winding by adjusting an amplification factor of the amplifier when the signal for adjusting the sensing level of the detecting means is received.

10. The voltage regulator as in claim 9, wherein:
the adjustment of the sensing level of the detecting means is carried out by writing an amount to be adjusted in a non-volatile memory that is brought to a condition under which such amount can be written.

11. A method of manufacturing a voltage regulator for an automotive alternator, the voltage regulator including means for regulating an output voltage of the alternator to a regulation voltage by controlling excitation current flowing through a field winding in an ON-OFF fashion and means for detecting the excitation current, the method comprising a step of adjusting a sensing level of the excitation current by supplying an amount of current that flows in an actual operation of the voltage regulator to the field winding, upon receiving a signal for adjusting the sensing level from outside the voltage regulator.

12. The method of manufacturing a voltage regulator as in claim 11, wherein:
the step of adjusting the sensing level is performed after the voltage regulator is molded in a single unit.

13. The method of manufacturing a voltage regulator as in claim 12, wherein:
the step of adjusting the sensing level is performed while supplying the excitation current in an amount equal to an amount of actual use and feeding a signal for performing the sensing level adjustment to a communication terminal of the voltage regulator.

14. A The method of manufacturing a voltage regulator as in claim 13, wherein:
the step of adjusting the sensing level is performed by adjusting an amplification factor of an amplifier for amplifying a voltage appearing across a sensing resistor through which a current proportional to the excitation current flows, so that an output voltage of the amplifier becomes equal to a voltage that correctly represents an amount of excitation current that actually flows in actual use.

15. A method of adjusting a voltage regulator for an automotive alternator, the voltage regulator including means for regulating an output voltage of the alternator to a regulation voltage by controlling excitation current flowing through a field winding in an ON-OFF fashion and means for detecting the excitation current, the method of adjusting comprising a step of adjusting a sensing level of the detecting means under a condition where the excitation current in an amount equal to actual use is supplied when a signal for adjusting the sensing level is received from outside the voltage regulator.

16. The method of adjusting a voltage regulator as in claim 15, wherein:
the step of adjusting a sensing level is performed after the voltage regulator is molded in a single unit.

17. The method of adjusting a voltage regulator as in claim 16, wherein:
the step of adjusting the sensing level is performed while supplying the excitation current in an amount equal to an amount of actual use and feeding a signal for performing the sensing level adjustment to a communication terminal of the voltage regulator.

18. The method of adjusting a voltage regulator as in claim 17, wherein:
the step of adjusting the sensing level is performed by adjusting an amplification factor of an amplifier for amplifying a voltage appearing across a sensing resistor through which a current proportional to the excitation current flows, so that an output voltage of the amplifier becomes equal to a voltage that correctly represents an amount of excitation current that actually flows in actual use.

19. A method of regulating an output voltage of an automotive alternator to a regulation voltage by detecting the output voltage and comparing the detected output voltage with the regulation voltage and by increasing the excitation current when the output voltage is lower than the regulation voltage while decreasing the excitation current when the output voltage is higher than the regulation voltage, the method being carried out by a voltage regulator and comprising steps of:

adjusting a level of detection of the excitation current while supplying an excitation current in an amount corresponding to an amount of actual use upon receipt of a signal demanding the detection level adjustment through a communicating circuit;

sending data showing the detected amount of the excitation current to an outside electronic device through the communicating circuit upon receipt of such request; and regulating the output voltage according to the regulation voltage upon receipt of the regulation voltage through the communicating circuit.

20. The regulating method as in claim 19, wherein:

the step of adjusting the detection level is performed by adjusting an amplification factor of an amplifier for amplifying a voltage appearing across a resistor through which a current corresponding to the excitation current flows; and the step of sending data is performed by sending an output of the amplifier as the data showing the amount of detected amount of the excitation current.

\* \* \* \* \*